United States Patent [19]
Southwick et al.

[11] 3,819,346
[45] June 25, 1974

[54] METHOD FOR APPLYING AN INORGANIC TIN COATING TO A GLASS SURFACE

[75] Inventors: Russell D. Southwick, Butler; Everett C. Smith, Slippery Rock, both of Pa.

[73] Assignee: Glass Container Manufacturers Institute, Inc., New York, N.Y.

[22] Filed: May 8, 1972

[21] Appl. No.: 251,159

[52] U.S. Cl.......................... 65/24, 65/60, 117/211
[51] Int. Cl............................................. C03b 17/20
[58] Field of Search.................. 55/24, 60; 117/211

[56] References Cited
UNITED STATES PATENTS

| | | | |
|---|---|---|---|
| 3,420,693 | 1/1969 | Scholes et al.......................... | 117/72 |
| 3,519,408 | 7/1970 | Russell................................... | 65/24 |
| 3,561,940 | 2/1971 | Scholes.................................. | 65/60 |

*Primary Examiner*—Arthur D. Kellogg
*Attorney, Agent, or Firm*—Kenyon & Kenyon Reilly Carr & Chapin

[57] ABSTRACT

An inorganic tin coating is applied to a glass surface by exposing the surface at elevated temperature, desirably at least 700°F., to a liquid comprising a tin chloride hydrate, for example an aqueous solution of stannic chloride pentahydrate. The process is especially useful for providing the "hot end coating" of a dual protective coating for glass containers comprising an inorganic "hot end coating" and a lubricious organic "cold end coating."

6 Claims, 1 Drawing Figure

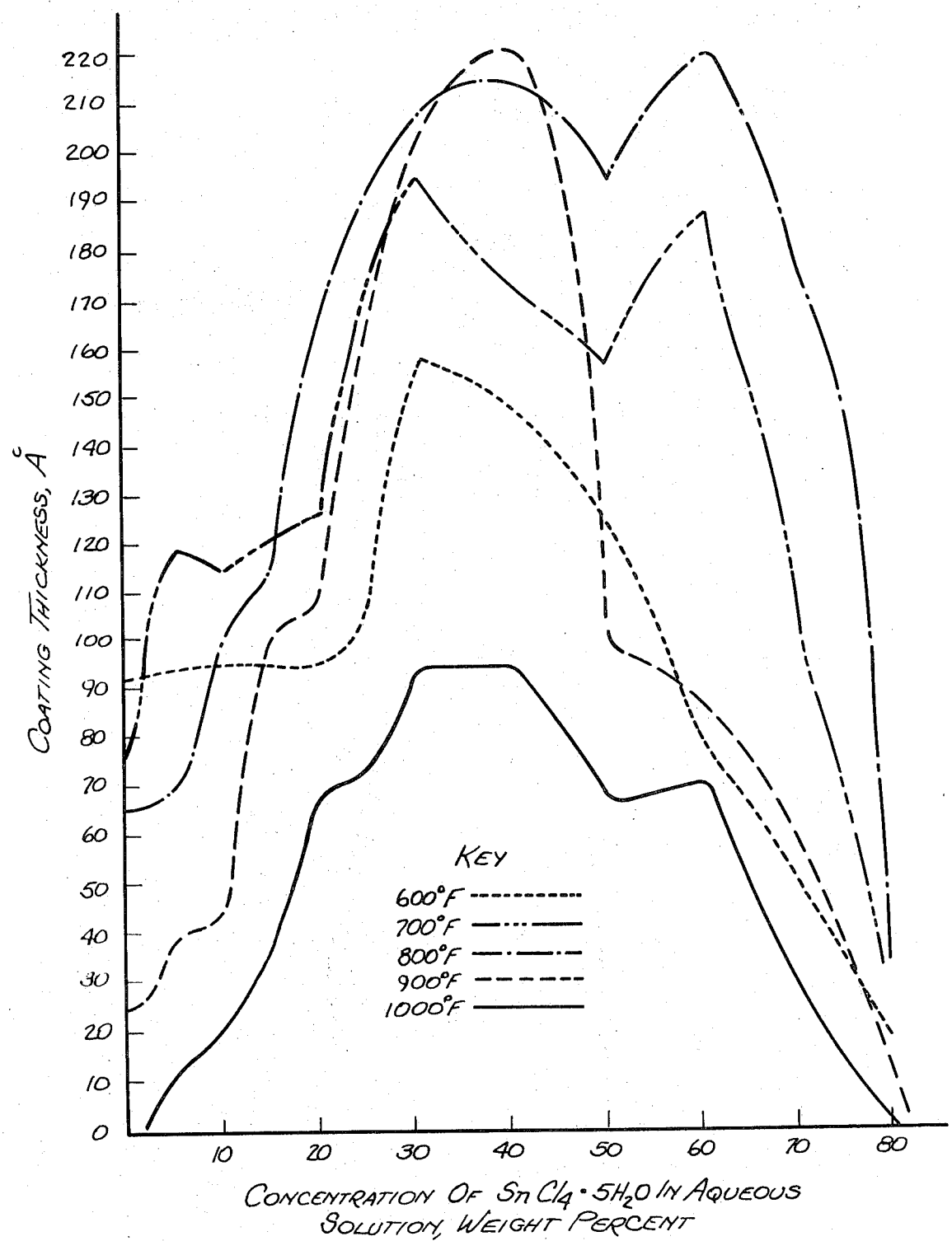

METHOD FOR APPLYING AN INORGANIC TIN COATING TO A GLASS SURFACE

DISCLOSURE

This invention relates to an improved method for applying an inorganic tin coating to a glass surface. More particularly, this invention is concerned with an improved method for applying an inorganic tin hot end coating to a glass container.

It has long been known that an inorganic tin coating can be applied to a glass surface by contacting a hot glass surface with a thermally-decomposable tin compound, whereby the compound, when brought in contact with the hot glass, decomposes to form what is believed to be a tin oxide layer on the surface of the hot glass. Processes of this type were disclosed by Lyle in U.S. Pat. No. 2,375,482 for imparting an iridescent finish to glass containers.

More recently, processes of this type have been adapted for use in protective coatings for glass containers, particularly beverage bottles and other similar containers. In these processes glass containers, such as glass bottles, while still hot from the bottle-forming equipment and before passage through the annealing lehr, are treated with a thermally-decomposable tin compound, usually stannic chloride, under conditions such that a thin coating is formed on the container surface. This coating is thinner than that taught by Lyle, and serves to anchor a lubricious organic polymer or wax coating applied to the container surface after they exit from the lehr. This combination of tin oxide "hot end" coating and organic "cold end" coating has been found useful in improving the scratch resistance and lubricity of glass containers.

Although this combined coating has been found useful, the method of applying end coating has several drawbacks. Until the present invention, it was believed that anhydrous compounds, especially anhydrous stannic chloride, were required. However, the use of these compounds led to numerous problems. First, it was necessary to entrain the tin halide fumes in a dry air stream, which normally is accomplished by bubbling dry air through liquid tin halide. If moisture should be introduced into the resulting air stream, a precipitate results which is corrosive to most materials used in the manufacture of the equipment employed.

Next, it is difficult to ensure formation of a uniform hot end coating when such a stream is used because the metal halide fumes can react with moisture in the atmosphere before contacting the glass surface. The result is non-uniform coating thicknesses and poor bottle-to-bottle reproducibility. Moreover, the loss of metal halide through such a reaction seriously reduces the efficiency of the use of the expensive metal halide reagent.

Finally, it is essential to prevent formation of a metal oxide coating on the finish, or mouth, of bottles so as to avoid corrosion of bottle caps. This control is difficult to achieve with air streams containing entrained metal halide fumes, especially with the so-called "stubby" beer bottles which are commonly employed today.

It is an object of this invention to provide an improved method for applying a metal oxide coating to a glass surface.

It is a further object of this invention to provide an improved method of applying metal oxide hot end coatings to glass containers.

A still further object of this invention is to provide a simple, economical process for applying hot end metal oxide coatings to glass containers which is free of the problems associated with the use of anhydrous metal halide reagents.

These and other objects of this invention, which are evident from the specification and claims, are achieved by spraying a liquid containing a stannic chloride hydrate onto a heated glass surface. The use of the hydrate avoids the need for equipment to afford anhydrous air streams of stannic chloride, and the attendant problems. In particular, air dryers and pressure feed lines necessitated by the use of anhydrous stannic chloride fumes are obviated, and a simple gravity feed system can be employed. In addition, the use of a liquid medium affords much greater control over the thickness and height of the resulting metal oxide coating. Because of the greater control, long spraying distances are feasible, thus enabling the use of wider passageways and minimizing container jam-ups at the hot end application station. Furthermore, stannic chloride hydrates, e.g. the pentahydrate, can produce equivalent coatings at considerably lower cost than the anhydrous stannic chloride, and are easier and safer to store than anhydrous tin halides.

The liquid which is employed can be molten tin chloride hydrate. For example, stannic chloride pentahydrate melts at 58°C., but on cooling remains a liquid at temperatures as low as 35°C., becoming noticeably more viscous as it cools. To avoid the need to heat the tin chloride hydrate, it is preferable to use it in the form of a solution in a suitable solvent, such as water or a lower alcohol, e.g. ethanol. Water is preferred from the standpoint of simplicity and economy.

When used in solution, the concentration of hydrate can vary from about 1 weight percent up to the solubility limit of the hydrate in the solvent, which is between 80 and 90 weight per cent for a solution of stannic chloride pentahydrate in water. The precise concentration is not critical to this invention, however, and will vary depending upon factors such as the desired thickness of the hot end coating and the equipment employed. In general, all other things being equal, coating thickness and solution viscosity both increase with increasing concentration. For most purposes, solution concentrations in the range of from about 40 to about 60 weight percent stannic chloride pentahydrate in water have been found useful.

The temperature of the hot glass is not narrowly critical, provided it is sufficient to promote formation of the desired coating. In particular, the temperature of the glass should be greater than about 700°F., and preferably greater than about 800°F., to ensure formation of a clear coating. Glass temperatures in the range of from about 900° to 1,100°F. are preferred.

The liquid tin chloride hydrate is applied to the glass in any suitable manner, preferably by spraying in known manner. When aqueous stannic chloride pentahydrate solutions are employed, the spray equipment should be acid resistant to avoid or minimize corrosion resulting from the highly acidic solution.

The process of this invention finds particular utility in providing a so-called "hot-end coating" for glass beverage bottles. For such use, it is readily employed by spraying the bottles after emergence from the forming machine and before entering the annealing lehr.

The following examples are illustrative:

EXAMPLE 1

2-inch squares of double strength plate glass were heated at temperatures of 600° to 1,000°F., and then sprayed with aqueous solutions containing from 1 weight percent to 80 weight percent of stannic chloride pentahydrate. In each case, the solution was applied with a Pyrex, 250-milliliter chromatography indicator atomizer spray bottle employing nitrogen at 25 psig as the entraining gas. The squares were sprayed for a period of 5 seconds and at a distance of 12 inches from the atomizer. The sprayed squares were allowed to cool and the thickness of the coating resulting from this treatment was measured with an Emhart reflectance meter. The result of these tests are presented graphically in the accompanying drawing.

As is evident, coating thickness increased with solution concentration up to a concentration of 30 to 40 weight per cent, and thereafter decreased. However, this decrease is believed due to the reduced amount of solution applied to the glass surface resulting from the increased viscosity of the more concentrated solutions.

The data plotted in the drawing also indicate that maximum coating thicknesses were obtained at glass temperatures of 800° and 900°F. In addition, as the concentration of the solution increased the maximum coating thickness was obtained at progressively higher temperatures. For example, the maximum coating thickness obtained with a 10 weight per cent solution occurred at 700°F., but occurred at 900°F. with the 70 weight per cent solution.

Finally, it was found that temperatures in excess of about 700°F. were required to provide a clear coating, with higher temperatures being required with more dilute solutions. Thus, although clear coatings were obtained at 700°F. with the 70 weight per cent solution, they could be obtained with 10 to 40 weight per cent solutions only at 900°F. or above.

EXAMPLE 2

Employing the apparatus described in Example 1, baby food jars heated at 950°F. were sprayed with 20 weight per cent, 50 weight per cent or 80 weight per cent aqueous solutions of stannic chloride pentahydrate. The bottles were sprayed at a distance of 12 inches using a nitrogen pressure of 15 psi for the 20 weight per cent and 50 weight per cent solutions and 30 psi for the 80 weight per cent solution for times of 4.5 to 5 seconds (one complete revolution of the jar) or 6 seconds (two revolutions).

After measuring the coating thickness, the jars were heated to 300°F. and sprayed with a 1 weight per cent aqueous solution of a commercially available cold end coating (Glasslube 1000" sold by Crown Chemical Corporation), and the wet scratch resistance was determined.

The wet scratch resistance of the resulting coatings was determined by a known procedure in which one bottle is securely held in a horizontal position and a second bottle is held in a horizontal position above and in contact with the first bottle at an angle between the axes of revolution of the bottles of 85° to 90°. The bottles were moved in sliding contact with one another over a distance of at least ⅜ inch at a rate not greater than 3 inches per minute under a load while continuously supplying water to the point of contact. The load level at which a visible scratch is observed on the container surface is recorded.

The results of these experiments are summarized as follows:

| Sample No. | Solution Concentration, Weight per cent | Application Time, Seconds | Hot End Coating Thickness, A | Wet Scratch Resistance Pounds |
|---|---|---|---|---|
| 1 | 20 | 5 | 46–58 | 120 |
| 2 | 20 | 5 | 46–88 | >120 |
| 3 | 20 | 5 | 63–72 | >120 |
| 4 | 20 | 6 | 40–94 | >120 |
| 5 | 50 | 4.5 | 126–200 | >120 |
| 6 | 50 | 4.5 | 117–200 | >120 |
| 7 | 50 | 4.5 | 117–175 | — |
| 8 | 50 | 4.5 | 149–202 | — |
| 9 | 80 | 4.5 | 52–91 | >120 |
| 10 | 80 | 4.5 | 45–94 | >120 |
| 11 | 80 | 4.5 | 52–122 | — |
| 12 | 80 | 4.5 | 63–107 | — |

It will be noted that, where wet scratch resistance was measured, it was at least 120 pounds, or at least as good as the wet scratch resistance achieved employing anhydrous stannic chloride vapors to form the hot end coating.

EXAMPLE 3

Employing apparatus similar to that described in Example 1, heated 4-ounce grape juice bottles were placed on a turntable and, when they had cooled to 1,000°F., were sprayed with a 50 weight per cent aqueous solution of stannic chloride pentahydrate for varying lengths of time to obtain hot end coatings up to 140 Angstroms thick. The coated bottles were then passed through a series of four ovens at progressively lower temperatures to simulate an annealing cycle, and were then sprayed with aqueous polyethylene emulsions containing 0.21, 1.05 or 2.10 weight per cent solids. After cooling, the coated bottle surfaces were subjected to the scratch test described above under wet and dry conditions at loads of 15 and 60 pounds and the frictional force during sliding was measured and the coefficient of sliding friction, or lubricity, was determined. The bottles were then subjected to a caustic wash with a solution containing 4.5 per cent sodium hydroxide and 0.5 per cent trisodium phosphate for 30 minutes at 150°F., rinsed in deionized water, and placed in an autoclave for 60 minutes at 15 psig and 250°F. After cooling they were again tested for lubricity at 15 and 60 pounds in the wet condition.

Following these tests, the hot end coating thickness was measured with a Hartford "171" Surface Coating Meter near the position on the bottle surface at which lubricity was measured.

In dry tests, very good lubricity (maximum average coefficient of friction of not greater than 0.05) was observed for all bottles having both a hot end coating and a cold end coating, as well as for bottles coated only with polyethylene. However, the film was damaged on bottles having been treated only with the 0.21 per cent polyethylene emulsion. In addition, the coating on bottles having a hot end coating thickness of less than 19 A and treated with the 0.21 per cent emulsion failed at 60 pounds. All other coatings withstood the lubricity test unharmed.

In the wet test, all samples having the combined hot end and cold end coating exhibited good lubricity (average maximum coefficient of friction not greater than 0.1) at 15 pounds, although samples having a hot end coating of less than about 20 A and using the 0.21 per cent polyethylene emulsion as a cold end coating exhibited damage. At 60 pounds all samples exhibited very good lubricity, except for samples made with the 0.21 per cent polyethylene emulsion and having a hot end coating of less than 34 A. These samples had maximum average coefficients of friction of about 0.2 and all exhibited damage to the surface.

Following the caustic wash and autoclave treatment, all coatings having a hot end coating thickness of at least 30 A and those coatings have a hot end coating thickness of at least 10 A and treated with the 2.10 per cent polyethylene emulsion exhibited very good lubricity and no damage at 15 and 60 pounds.

What is claimed is:

1. A method for coating a glass container comprising spraying an aqueous solution of a tin chloride hydrate onto the surface of said container while said container is at a temperature of greater than 700°F, said aqueous solution containing from about 40 to about 60 weight per cent of said hydrate.

2. A method according to claim 1 wherein said hydrate is stannic chloride pentahydrate.

3. A method according to claim 2 wherein the temperature of said heated glass container is in the range of from 900° to 1,100°F.

4. In a method of imparting improved lubricity and scratch resistance to a glass container comprising the steps of contacting a heated container with a thermally decomposable tin compound to provide an inorganic tin coating, cooling the container, and contacting the cooled container with an organic material to provide a lubricious organic coating, the step of forming said inorganic tin coating by spraying onto the surface of said heated container at a temperature of greater than 700°F. with an aqueous solution of a tin chloride hydrate, said aqueous solution containing from about 40 to about 60 weight per cent of said hydrate.

5. A method according to claim 4 wherein said hydrate is stannic chloride pentahydrate.

6. A method according to claim 4 wherein the temperature of said heated glass container is in the range of from about 900° to 1,100°F.

* * * * *